US006581905B2

(12) United States Patent
Rafko et al.

(10) Patent No.: US 6,581,905 B2
(45) Date of Patent: Jun. 24, 2003

(54) BRAKE BLEED TOOL

(75) Inventors: David Charles Rafko, Monroe, MI (US); Timothy Johnson, Erie, MI (US)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/989,870

(22) Filed: Nov. 21, 2001

(65) Prior Publication Data

US 2003/0094591 A1 May 22, 2003

(Under 37 CFR 1.47)

(51) Int. Cl.[7] ................................................ F16K 51/00
(52) U.S. Cl. .................. 251/148; 251/346; 251/351; 251/352; 81/121.1; 141/98; 188/352
(58) Field of Search ................. 251/346, 351, 251/352, 148, 264; 141/98; 188/352; 81/121.1

(56) References Cited

U.S. PATENT DOCUMENTS

| | | | | | |
|---|---|---|---|---|---|
| 2,771,093 | A | * | 11/1956 | Wilson | 188/352 |
| 3,301,282 | A | * | 1/1967 | Fresolone, Jr. | 141/98 |
| 3,635,262 | A | * | 1/1972 | Stebbins | 141/98 |
| 3,677,513 | A | * | 7/1972 | Truelove | 251/148 |
| 3,809,359 | A | | 5/1974 | Truelove, Sr. | |
| 4,149,560 | A | * | 4/1979 | Berg | 188/352 |
| 4,280,498 | A | * | 7/1981 | Jensen | 251/352 |
| 4,497,176 | A | | 2/1985 | Rubbin et al. | |
| 4,785,629 | A | * | 11/1988 | Ennis et al. | 188/352 |
| 4,865,171 | A | * | 9/1989 | Miller | 188/352 |
| 4,989,639 | A | * | 2/1991 | Sulwer | 188/352 |
| 5,299,777 | A | * | 4/1994 | Milstead | 251/352 |
| 5,368,181 | A | * | 11/1994 | Myers | 141/98 |
| 5,788,672 | A | | 8/1998 | Saito | |
| 5,816,281 | A | * | 10/1998 | Mixon | 188/352 |
| 5,967,199 | A | | 10/1999 | Riddiford et al. | |
| 6,196,364 | B1 | * | 3/2001 | Fouts | 188/352 |

* cited by examiner

Primary Examiner—Ehud Gartenberg
Assistant Examiner—John Bastianelli
(74) Attorney, Agent, or Firm—Harness, Dickey & Pierce, PLC

(57) ABSTRACT

A brake bleed tool includes a pliable plastic tube which sealingly engages a bleed fitting. A bleed wrench coaxially slides along the tool to engage the bleed fitting. The bleed wrench includes a socket end for engaging the bleed fitting at one end and a winged end at the opposite end which is used to loosen and tighten the bleed fitting.

7 Claims, 3 Drawing Sheets

BRAKE BLEED TOOL

FIELD OF THE INVENTION

The present invention relates to tools used for bleeding a brake system. More particularly, the present invention relates to a brake bleed tool which simplifies the bleeding process while eliminating the leaking of brake fluid into the surrounding environment during the bleeding process.

BACKGROUND OF THE INVENTION

Hydraulic brake systems work because of the non-compressability of the hydraulic fluid within the systems. Thus, it is necessary to remove all gas such as air from the braking system. With gas or air in one or more of the brake lines, considerable effort is spent first compressing the air before any movement of the braking components occur. This presence of gas or air causes the brake pedal to be spongy, i.e., the brake pedal goes part way down without noticeable effort because air in the hydraulic line is being compressed.

The process for removing gas or air from the brake system is known as bleeding the brake system. There are several methods for bleeding a brake system for a motor vehicle. When bleeding the brake system at an assembly plant, a vacuum evacuation and brake fluid fill system is utilized. The vacuum evaluation and brake fluid fill system is mounted to a filler tube of the master cylinder of the brake system and it has a controller for directing the operation of the system first to evacuate the brake system and then pressure fill the brake system with brake fluid. In doing so, this method results in using a system which is expensive, cumbersome and needs a pressure and vacuum system.

When bleeding the brake in the after market, one method involves the use of a bleeder ball system. The bleeder ball system includes a spherical ball filled with brake fluid and a hose to attach the ball to a fluid reservoir of the master cylinder of the brake system. The bleeder ball system is connected to a constant source of air pressure to push air bubbles from the brake system as a fitting or bleeder tube is opened. In so doing, this method results in using a system which is relatively expensive, messy and needs a constant air pressure source.

The simplest and least costly method of bleeding the brake system in the after market is to open bleed ports or fittings in the brake system and then apply the brakes by pushing the brake pedal to the floor. While the brake pedal is being depressed, the ports or fittings are left open to allow brake fluid and trapped air to bleed out of the brake system. While keeping the brake pedal depressed, the bleeding ports or fittings are closed and then the brake pedal is released which allows brake fluid in the master cylinder reservoir to enter the brake lines replacing the fluid and trapped air that was bled out of the brake system. This method is somewhat time consuming and can result in excess brake fluid spilling over the work place, being messy, laborous and cumbersome and it is somewhat difficult to flush all air from the brake system.

One method used to contain the fluid being bled from the brake system is to sealingly attach a tube to the bleeding ports or fittings and then running this tube to some type of container to contain the bled fluid. While the use of this tube connection has helped to improve the cleanliness of the bleeding process, the use of the tube can result in the increased difficulty in opening and closing the bleeding port or fitting at the appropriate time. Thus, there is a need in the art for a bleeding system which can improve the cleanliness of the process without interfering with the bleeding process.

SUMMARY OF THE INVENTION

The present invention provides the art with a bleeding system which composes a bleeding tube which is designed to sealingly engage the bleeding port or fitting and a wrench coaxially surrounding the bleeding tube which is utilized to loosen and tighten the bleeding port or fitting.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
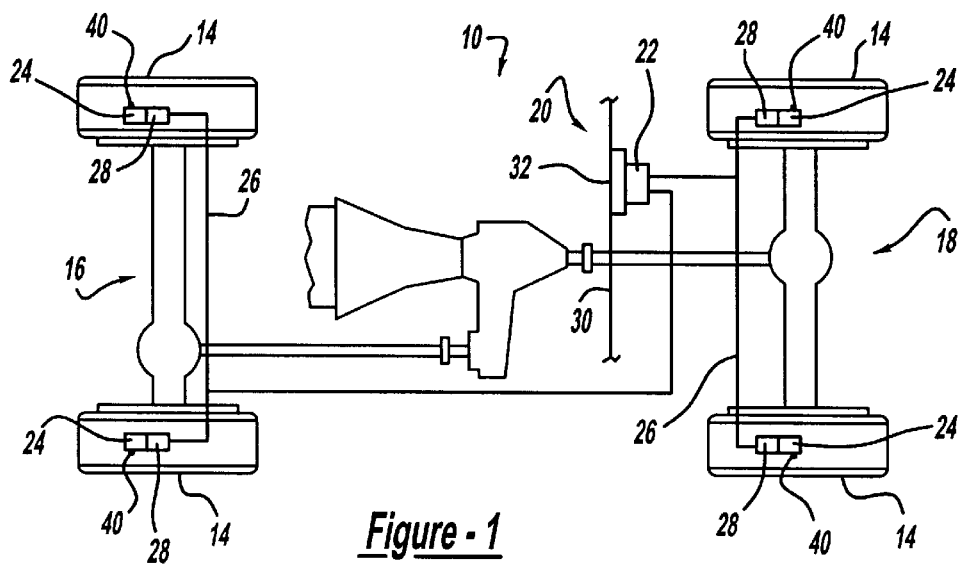
FIG. 1 schematically illustrates a vehicle incorporating a hydraulic braking system.
Figure 2:
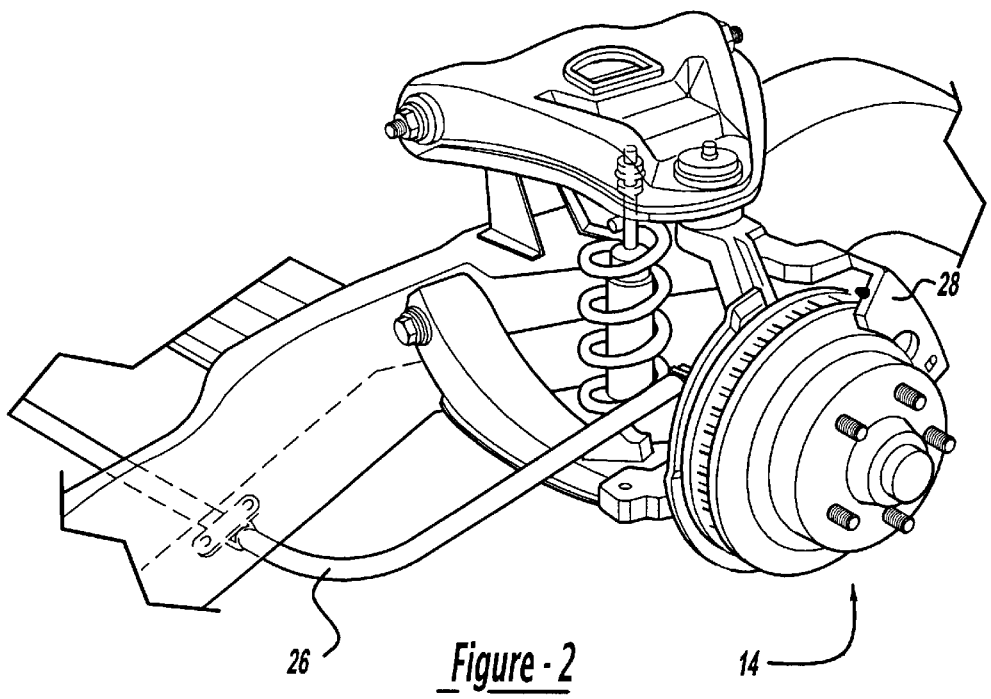
FIG. 2 illustrates one of the wheel assemblies for the vehicle shown in FIG. 1.

Referring now to the drawings in which like reference numerals designate like or corresponding parts throughout the several views, there is shown in FIG. 1 a vehicle incorporating a hydraulic brake system and which is designated generally by the reference numeral 10. Vehicle 10 comprises a vehicle body (not shown) supported by four wheels 14 through a front suspension 16 and a rear suspension 18. A hydraulic brake system 20 is designed to be activated by the operator of vehicle 10 in order to stop vehicle 10 by placing resistance to rotation onto wheels 14.

Hydraulic brake system 20 comprises a master cylinder 22, a plurality of slave cylinders 24, brake lines 26 and a plurality of braking mechanisms 28. Master cylinder 22 is typically mounted on a firewall 30 of vehicle 10 and it is operated using a brake pedal (not shown) as is well known in the art. The operation of master cylinder 22 by the brake pedal may or may not be through a power assist system which is typically a vacuum assist system. A slave cylinder 24 is positioned at each wheel 14 and each slave cylinder 24 is attached to master cylinder 22 through brake lines 26. Each slave cylinder 24 is mechanically interconnected to a respective braking mechanism 28. Braking mechanism 28 is typically a disc brake or a drum brake and it is utilized to impede the rotational motion of each wheel 14 through friction as is well known in the art.

In operation, when master cylinder 22 is activated by the operator using the brake pedal, hydraulic fluid in master cylinder 22 is pushed from master cylinder 22 to each slave cylinder 24 through brake lines 26. A brake fluid reservoir 32 associated with master cylinder 22 ensures that only hydraulic brake fluid and not air is allowed into master cylinder 22, slave cylinders 24 and brake lines 26.

When hydraulic brake system 20, wheels 14 or other portions of vehicle 10 are serviced, it may become necessary to dismantle or otherwise unseal hydraulic brake system 20. It then becomes necessary to bleed brake system 20 during reassembly to ensure that all air within master cylinder 22, slave cylinders 24 and fluid lines 26 has been removed. When one of the more sophisticated and expensive systems are not available, manual bleeding of brake system 20 is required. This manual bleeding of braking system 20 is accomplished by utilization of bleed valves 40 which are located on each of slave cylinders 24. Typically the bleed valve 40 associated with the slave cylinder 24 associated with the wheel 14 furthest from master cylinder 22 is bled first. This is accomplished by opening bleed valve 40, depressing the brake valve to allow a mixture of air and hydraulic fluid to flow through bleed valve 40, closing bleed valve 40 and then releasing the brake pedal to replace the fluid in the system from reservoir 32. This process is repeated until only hydraulic fluid flows through bleed valve 40 during the depressing of the brake pedal. This procedure is then completed for each wheel 14 moving towards the next wheel 14 furthest from master cylinder 22 until all four wheels 14 have been bled.

Figure 3:
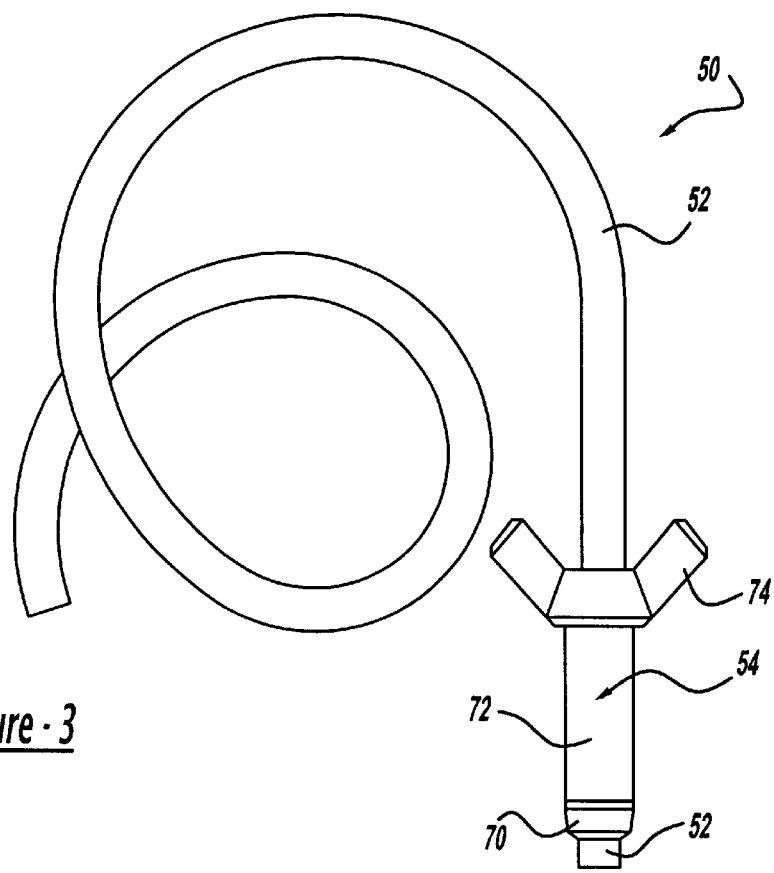
FIG. 3 illustrates the brake bleed tool in accordance with the present invention.
Figure 4:
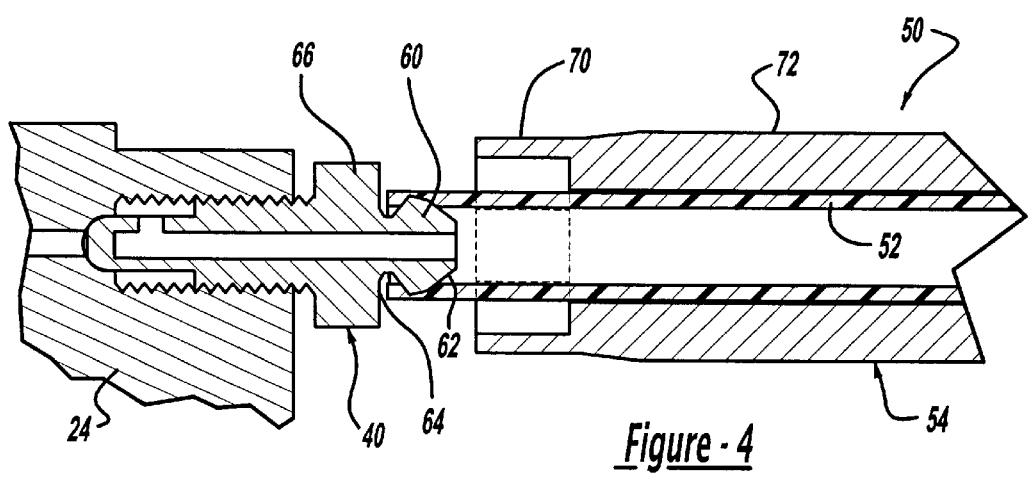
FIG. 4 illustrates the brake bleed tool in accordance with the present invention prior to the tube of the brake bleed tool engaging the bleed fitting of the hydraulic brake system.
Figure 5:
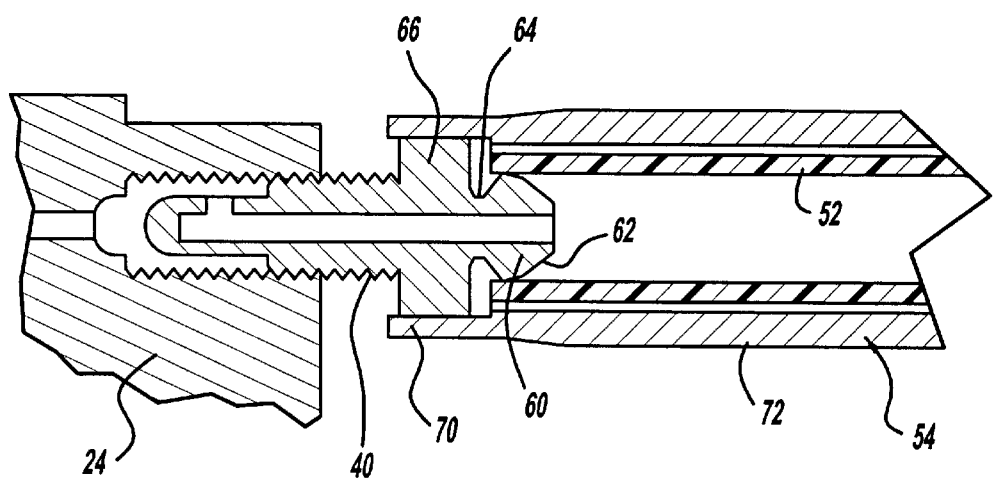
FIG. 5 illustrates the brake bleed tool of the present invention in engagement with the bleed fitting of the present invention.

Referring now to FIGS. 3–5, the present invention provides a brake bleeding tool 50 which assists in the manual bleeding of brake system 20. Brake bleeding tool 50 comprises a plastic tube 52 and a bleed wrench 54. Tube 52 is manufactured from a material that is compatible with the brake fluid used by braking system 20. Tube 52 is of sufficient length that it can reach between each of wheels 14 and a container (not shown) for holding the discarded hydraulic fluid from brake system 20. Typically, bleed valve 40 includes a head 60 having a frusto-conical shaped end 62, a relief section 64 and a hexagonal fastening end 66. Tube 52 is manufactured from a pliable plastic which expands as it is pushed over frusto-conical shaped end 62 and then relaxes into relief section 64 to provide a seal between tube 52 and bleed valve 40 as shown in FIG. 4.

Bleed wrench 54 includes a sockethead end 70, a spacer tube 72 and a winged end 74. Tube 52 extends through sockethead end 70, spacer tube 72 and winged end 74 as is shown in FIG. 3. Once tube 52 has been attached to bleed valve 40, bleed wrench 54 is slid along tube 52 until sockethead end 70 engages hexagonal fastening end 66. Bleed valve 40 can be loosened (opened) and tightened (closed) by rotating bleed valve 40 using winged end 74 to apply the necessary torque. Thus, as the brake pedal is pressed and released, bleed valve 40 can be easily opened and closed at the appropriate time to bleed brake system 20. In addition, as brake fluid is released through bleed valve 40, it is easily and safely transported to an appropriate container avoiding the spilling of the hydraulic fluid.

The present invention thus provides a simple low cost solution to the problems associated with manual bleeding of a brake system. By having a series of brake bleed tools 50 of various sizes available, a mechanic can quickly and easily bleed the brake system for any vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A brake bleeding tool comprising:
   a pliable tube adapted to be sealingly retained on a bleed valve solely due to elastic deformation of said tube; and
   a bleed wrench slidably engaging said tube, said bleed wrench being adapted to engage said bleed valve and wherein said pliable tube extends entirely through said bleed wrench.

2. The brake bleeding tool according to claim 1, wherein said bleed wrench is disposed coaxially with respect to said tube.

3. The brake bleeding tool according to claim 1, wherein said bleed wrench includes a socket end and a winged end.

4. The brake bleeding tool according to claim 3, comprising a tube spacer disposed between said socket end and said winged end.

5. The brake bleeding tool according to claim 4, wherein said socket end, said tube spacer and said winged end are disposed coaxially with respect to said tube.

6. The brake bleeding tool according to claim 3, wherein said socket end and said winged end are disposed coaxially with respect to said tube.

7. The brake bleeding tool according to claim 1 wherein said pliable tube is longer than said bleed wrench.

* * * * *